Nov. 17, 1936.  C. L. HALL  2,061,463
CLIP MEMBER
Filed Jan. 2, 1935
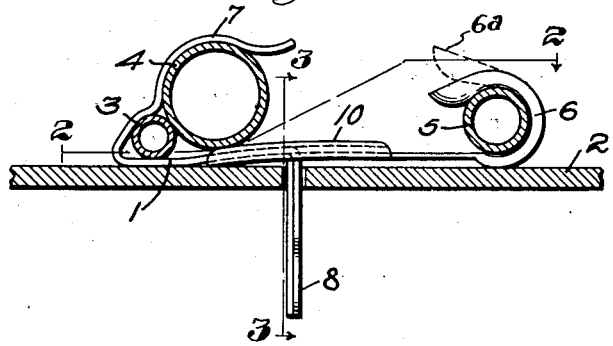
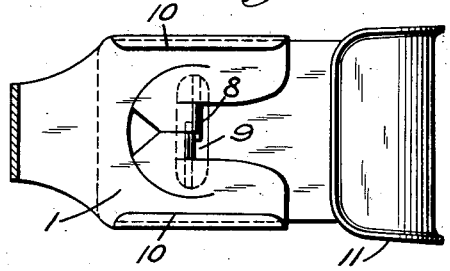
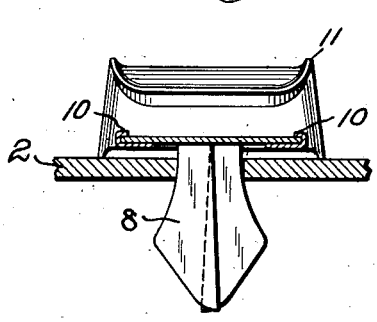
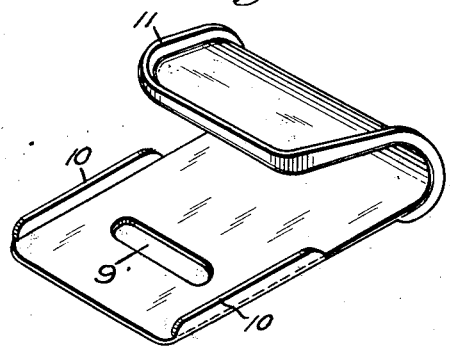
Inventor:
Charles L. Hall,
by Walter S. Jones
Atty.

Patented Nov. 17, 1936

2,061,463

UNITED STATES PATENT OFFICE 2,061,463

CLIP MEMBER

Charles L. Hall, Detroit, Mich., assignor to United-Carr Fastener Corporation, Cambridge, Mass., a corporation of Massachusetts Application January 2, 1935, Serial No. 128

2 Claims. (Cl. 248—73)

My invention aims to provide improvements in clip members for securing wires, tubes, rods and like members to a supporting structure.

In the drawing, which illustrates a preferred form of my invention:

Figure 1 is a side view of a complete installation including my improved clip member;

Fig. 2 is a top plan sectional view of the device taken on the line 2—2 of Fig. 1;

Fig. 3 is a section taken on the line 3—3 of Fig. 1; and

Fig. 4 is a perspective view of that part of the clip member which is new.

My invention is in the nature of a device used in combination with a device such as shown in the co-pending application of Rollo F. Walters Serial No. 510,225, filed January 21, 1931, Patent No. 1,995,370 of March 26, 1935, although it may be used with equal success in connection with other snap fastened conduit holders.

Referring to the installation as a whole I have shown a snap-fastened clip member 1, such as is described in the co-pending Walters application above-mentioned, a frame member 2, several pipes or tubes 3, 4 and 5 and my improved auxiliary clip member 6. The clip member 1 comprises a spring-holding member 7 and a pair of spring arms 8 forming what is known in the art as a "scissors fastener". The fastener I have shown is a slight modification of that illustrated by Walters in that the sides of the base (Fig. 2) are straight and substantially parallel, the purpose of which will be more fully explained. My improved clip 6 is preferably formed from some kind of soft sheet metal which is readily bendable, but not to the extent of flimsiness. As shown in Fig. 4, the clip has a flat portion through which is pierced an aperture 9, adapted to receive the engaging projections of the fastener member to be used, which in this case calls for a transverse elongated slot, as shown. The sides of the flat portion near the end where the aperture is located are bent up to form flanges 10 which act as guide members for the base of the fastener 1, and prevent relative movement of the two parts. At the end of the clip remote from the aperture the sides and the end of the clip are rolled up on the opposite side of the material from the flanges 10 to form an additional flange 11, which adds strength and rigidity to the clip. As will be seen in the drawing (Fig. 4) when the end portion of the clip is bent up to form the hook, this flange 11 will be on the outside of the bend.

In order to explain fully the nature and purpose of my invention, I shall now proceed with an account of its operation. First the clip 6 is placed on the frame so that the aperture 9 overlies a suitable aperture in the frame member; then the scissor arms 8 of the fastener are inserted in the aperture and the fastener 1 is pushed down until the base lies between the flanges 10, at which point the arms 8 will have engaged the support 2. Next the tubes or wires 3 and 4 are snapped into place under the holding arm 7. Lastly, the tube or wire 5 is pushed under the hook of the clip 6, which is in the position indicated by the broken lines 6a in Fig. 1, and the end of the hook is bent down over the tube, securing it in place.

My invention is particularly useful for installations in and around motor vehicles and the like, where it is often necessary to have two or more tubes or wires (as 3 and 4) follow a certain frame member for some distance, and to have another tube such as 5 follow a somewhat different course which meets up at certain points with the course of the first-mentioned tubes. Then it is very convenient to have on hand a number of my auxiliary clips to use in connection with the fasteners 1, at such points where the lines of tubing or wiring are coincidental. Of course, there are other uses for my invention, and I have used the above merely for purposes of description. Furthermore, the clip members 1 and 6 may be assembled together before application if desired. This may be accomplished by bending over the edges of the flanges 10—10 to grip the base of the clip 1, as shown in Figs 2 and 3, or by having an aperture 9 of such dimensions that the arms 8 will snap through and hold the parts together, or both features may be used.

While I have illustrated and described a preferred embodiment of my invention, I do not wish to be limited by such description as the scope of my invention is best defined by the following claims.

I claim:—

1. The combination with an apertured supporting member of a plurality of wires and the like to be detachably secured to said support, a sheet metal snap fastener member having yieldable projections engaging the sides of the aperture in said supporting member, said fastener having a clip-like base securing one or more of said wires and the like to said support, and an auxiliary clip member of relatively soft bendable material having a wire-receiving bent portion at one end, the other end of said clip being located between the head of said fastener member and said supporting member, said clip having an aperture for the passage of the yieldable projections of said fastener member, said fastener member thereby securing said clip to said support and the bent end of said clip being further curved around said wire whereby said wire is secured to said supporting member.

2. In a combination with a frame member having an aperture therethrough, a conduit-holding clip member formed from relatively soft bendable sheet metal and having an aperture therethrough overlying the aperture in said frame member, said clip member having an integral flange extending upwardly from each side thereof adjacent to the aperture therein and that portion of said clip adjacent the aperture being substantially flat and in juxtaposition to said frame member, another portion of said clip remote from said aperture being bent back towards the aperture to form an open loop adapted to receive a portion of a conduit, the edges of said looped portion being upturned for the purpose of making said loop more rigid, a second clip member having a base portion overlying the first mentioned clip adjacent to the aperture therein and restrained from lateral motion by the flanges upon the first mentioned clip member, the second clip having means integral with the base portion for holding a conduit and the like and yieldable spring fingers integral with said base and extending therefrom directly through both apertures in alignment and said fingers being adapted to engage the walls of the aperture in said frame member whereby the parts are held in assembly.

CHARLES L. HALL.